United States Patent
Nishide et al.

(10) Patent No.: US 6,795,522 B2
(45) Date of Patent: Sep. 21, 2004

(54) BACKPROJECTION METHOD AND X-RAY CT APPARATUS

(75) Inventors: Akihiko Nishide, Tokyo (JP); Akira Hagiwara, Tokyo (JP)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 44 days.

(21) Appl. No.: 10/370,651

(22) Filed: Feb. 20, 2003

(65) Prior Publication Data

US 2003/0161433 A1 Aug. 28, 2003

(30) Foreign Application Priority Data

Feb. 22, 2002 (JP) ........................................ 2002-045494

(51) Int. Cl.[7] ............................................ G01N 23/083
(52) U.S. Cl. ............................. 378/4; 378/19; 378/901
(58) Field of Search ............................... 378/4, 19, 15, 378/901; 382/131

(56) References Cited

U.S. PATENT DOCUMENTS

| | | | |
|---|---|---|---|
| 4,365,339 A | 12/1982 | Pavkovich et al. | |
| 4,896,287 A | 1/1990 | O'Donnell et al. | |
| 5,241,576 A | 8/1993 | Lonn | |
| 5,359,638 A | 10/1994 | Hsieh et al. | |
| 5,469,487 A | * 11/1995 | Hu | 378/9 |
| 5,473,654 A | 12/1995 | Kotian et al. | |
| 5,491,745 A | * 2/1996 | Roeder | 379/355.09 |
| 5,761,257 A | * 6/1998 | Toth et al. | 378/19 |
| 6,411,670 B1 | * 6/2002 | Besson | 378/4 |
| 6,477,221 B1 | * 11/2002 | Ning | 378/4 |

* cited by examiner

Primary Examiner—David V. Bruce
Assistant Examiner—Irakli Kiknadze
(74) Attorney, Agent, or Firm—Carl B. Horton, Esq.; Armstrong Teasdale LLP

(57) ABSTRACT

For the purpose of providing a backprojection method and an X-ray CT apparatus by which backprojection processing can be simplified and sped up, instead of obtaining backprojection pixel data D2(x, y) directly from projection data D0 (view, ch), axially projected data D1 (view, pt) are obtained from projection data D0 (view, ch) by projecting them onto a straight line, and then backprojection pixel data D2 are obtained from the axially projected data D1.

18 Claims, 19 Drawing Sheets

| view=45° -Δview | | | |
| view= ··· | | | |
| view=0° | | | |
| view= ··· | | | |
| view= -45° | | | |
| pt | ch(pt) | k1(pt) | k2(pt) |
| 0 | | | |
| 1 | | | |
| 2 | | | |
| Pe | | | |

| | | | | | |
|---|---|---|---|---|---|
| view=45° -Δview | | | | | |
| view= | | | | | |
| view=0° | | | | | |
| view= | | | | | |
| view= -45° | | | | | |
| y | R (y) | Δ pt | str_pt | str_x | end_x |
| 0 | | | | | |
| 1 | | | | | |
| 2 | | | | | |
| | | | | | |
| Ye | | | | | |

$-45° \leq \text{view} < 45°$    $135° \leq \text{view} < 225°$
D1 (view, pt) = k1(pt) x D0 (view, ch(pt)+1) + k2(pt) x D0 (view, ch(pt))

-45° ≦ view<45°　　135° ≦ view<225°

45° ≦ view<135°    225° ≦ view<315°
D1 (view, pt) =k1(pt) x D0 (view, ch(pt)+1) +k2(pt) x D0 (view, ch(pt))

$-45° \leq \text{view} < 45°$  $135° \leq \text{view} < 225°$
$R(x) = (r1(x)/r2(x))^2$
$D2(\text{view}, x, y) = R(x) \times D1(\text{view}, \text{str\_pt} + (y - \text{str\_y})\Delta \text{pt})$
$D2(x, y) = \sum_{\text{view}} D2(\text{view}, x, y)$ -45° ≦ view<45° or
135° ≦ view<225°

45° ≦ view<135° or
225° ≦ view<315°

| pt | ch (pt) | k1 (pt) | k2 (pt) | k3 (pt) |
|---|---|---|---|---|
| 0 | | | | |
| 1 | | | | |
| 2 | | | | |
| Pe | | | | |

(stacked views: view=45°, view=, view=0°, view=, view=-45°)

D1 (view, pt) = k1(pt) x D0 (view, ch(pt)+2) + k2(pt) x D0 (view, ch(pt)+1) + k3(pt) x D0 (view, ch(pt))

BACKPROJECTION METHOD AND X-RAY CT APPARATUS

CROSS REFERENCE TO RELATED APPLICATIONS

This application claims the benefit of Japanese Application No. 2002-045494 filed Feb. 22, 2002.

BACKGROUND OF THE INVENTION

The present invention relates to a backprojection method and an X-ray CT (computed tomography) apparatus, and more particularly to a backprojection method and an X-ray CT apparatus by which backprojection processing can be simplified and sped up.

The current mainstream X-ray CT apparatus implements a filtered backprojection technique involving processes of data collection, preprocessing, filtering, backprojection processing, and post-processing to thereby reconstruct an image.

Conventional backprojection processing is disclosed in, for example, Japanese Patent Application Laid Open No. H8-187241 and U.S. Pat. No. 5,414,622.

In such backprojection processing, projection data D0(view, ch) obtained by a fan beam represented by a view angle view and a detector channel ch is subjected to a calculation for projecting the projection data D0(view, ch) onto coordinates (x, y) of a pixel constituting a reconstruction region to obtain backprojection pixel data D2(x, y), and the backprojection pixel data D2(x, y) for all views employed in image reconstruction are added to obtain backprojection data D3(x, y).

In the conventional backprojection processing, a calculation for obtaining the backprojection pixel data D2(x, y) from the projection data D0(view, ch) must be conducted for, for example, 512×512 pixels, in which the projection data D0(view, ch) line up along arc-shaped geometrical positions corresponding to an arc-like shape of the detector, and the backprojection pixel data D2(x, y) line up along geometrical positions on rectangular coordinates of a reconstruction region. This raises the problems that the processing is intricate and time-consuming.

SUMMARY OF THE INVENTION

It is therefore an object of the present invention is to provide a backprojection method and an X-ray CT apparatus by which backprojection processing can be simplified and sped up.

The present invention, in accordance with its first aspect, provides a backprojection method characterized in comprising the steps of: obtaining axially projected data D1 by projecting projection data D0(view, ch) obtained by a fan beam represented by a view angle view and a detector channel ch onto a straight projection axis; then, obtaining backprojection pixel data D2 by projecting said axially projected data D1 onto pixels constituting a reconstruction region; and obtaining backprojection data D3 by adding the backprojection pixel data D2 for all views employed in image reconstruction on a pixel-to-pixel basis.

In the backprojection method of the first aspect, instead of obtaining the backprojection pixel data D2 directly from the projection data D0(view, ch), axially projected data D1(view, pt) is obtained from the projection data D0(view, ch), and then backprojection pixel data D2(x, y) is obtained from the axially projected data D1. The symbol pt represents a coordinate on the projection axis.

Although the calculation for obtaining the axially projected data D1(view, pt) lining up along geometrical positions on a straight projection axis from the projection data D0(view, ch) lining up along arc-shaped geometrical positions corresponding to an arc-like shape of the detector has a processing load per datum identical to that of a conventional calculation for obtaining backprojection pixel data D2(x, y) from the projection data D0(view, ch), the number of data is no more than about 8,000, for example, which is only 1/30 of that of the conventional 512×512 pixels. On the other hand, although the calculation for obtaining the backprojection pixel data D2 from the axially projected data D1 requires calculations for 512×512 pixels as in the prior art, the calculation for obtaining the backprojection pixel data D2(x, y) lining up on rectangular coordinates from the axially projected data D1(view, pt) lining up along a straight line needs only simple processing involving mere sampling at a regular pitch and multiplication by a distance factor. Thus, as a whole, the backprojection processing can be simplified and sped up.

The present invention, in accordance with its second aspect, provides the backprojection method of the aforementioned configuration, characterized in that when a direction of a center axis of the fan beam at views=0° is represented by a y-direction and a direction orthogonal to the y-direction and parallel to a fan beam plane is represented by an x-direction, said projection axis is defined as a straight line passing through a center of reconstruction and parallel to the x-direction for a view angle range of $-45° \leq \text{view} < 45°$ or a view angle range mainly including the range and also including its vicinity, and for a view angle range of $135 \leq \text{view} < 225°$ or a view angle range mainly including the range and also including its vicinity; and said projection axis is defined as a straight line passing through the center of reconstruction and parallel to the y-direction for a view angle range of $45° \leq \text{view} < 135°$ or a view angle range mainly including the range and also including its vicinity, and for a view angle range of $225° \leq \text{view} < 315°$ or a view angle range mainly including the range and also including its vicinity.

Note that view=−45° and view=315° are separately expressed herein for convenience of representation, but they are the same and represent the same view in reality.

When data is projected onto a straight projection axis, accuracy increases as the angle formed between the projection direction line and the projection axis approaches 90°, and accuracy decreases as the angle approaches 0°.

In the backprojection method of the second aspect, since the angle formed between the projection direction line and the projection axis never falls below about 45°, reduction in accuracy is prevented.

The present invention, in accordance with its third aspect, provides the backprojection method of the aforementioned configuration, characterized in that one axially projected datum D1 is obtained by interpolation calculation from a plurality of projection data D0.

The number of projection data D0 and the positional intervals thereof at one view angle are determined by the detector. Specifically, the number of projection data D0 is "the number of channels of the detector (e.g., 1,000)", and the positional intervals of the projection data D0 are "the channel pitch of the detector (e.g., 1 mm)".

In the backprojection method of the third aspect, since one axially projected datum D1 is obtained by interpolation calculation from a plurality of projection data D0, the number of the axially projected data D1 (e.g., 3,500 per view angle) and the data intervals thereof (e.g., 1 mm) on the projection axis can be selected without limitation by the number and position intervals of the projection data D0.

The present invention, in accordance with its fourth aspect, provides the backprojection method of the aforementioned configuration, characterized in that addresses of the plurality of projection data D0 and interpolation factors for obtaining the one axially projected datum D1 are set in a table.

Although the addresses of the plurality of projection data D0 and interpolation factors for obtaining the one axially projected datum D1 may be calculated each time the one axially projected datum D1 is to be obtained, the time of the calculation is an overhead.

In the backprojection method of the fourth aspect, this overhead is eliminated by calculating beforehand the addresses of the plurality of projection data D0 and interpolation factors and setting them in a table.

The present invention, in accordance with its fifth aspect, provides the backprojection method of the aforementioned configuration, characterized in further comprising the steps of: obtaining one axially projected datum D1 by interpolation calculation from a plurality of projection data D0; setting in a table addresses of the plurality of projection data D0 and interpolation factors for obtaining the one axially projected datum D1 for any one of a view angle range of $-45° \leq view < 45°$ or a view angle range mainly including the range and also including its vicinity, a view angle range of $135° \leq view < 225°$ or a view angle range mainly including the range and also including its vicinity, a view angle range of $45° \leq view < 135°$ or a view angle range mainly including the range and also including its vicinity, and a view angle range of $225° \leq view < 315°$ or a view angle range mainly including the range and also including its vicinity; and using said table for other view angle ranges.

Considering a case in which the projection axis is defined as a straight line parallel to the x-axis direction of the reconstruction plane and passing through the center of reconstruction, when the geometrical relationship of the X-ray tube, detector and projection axis is rotated by 180° around the center of reconstruction for a view angle range of $135° \leq view < 225°$ or a view angle range mainly including the range and also including its vicinity, the geometrical relationship coincides with that of the X-ray tube, detector and projection axis for a view angle range of $-45° \leq view < 45°$ or a view angle range mainly including the range and also including its vicinity. Therefore, the addresses of the projection data D0 and the interpolation factors for obtaining one axially projected datum D1 can be used in common in these view angle ranges.

Moreover, considering a case in which the projection axis is defined as a straight line parallel to the y-axis direction of the reconstruction plane and passing through the center of reconstruction, when the geometrical relationship of the X-ray tube, detector and projection axis is rotated by $-90°$ around the center of reconstruction for a view angle range of $45° \leq view < 135°$ or a view angle range mainly including the range and also including its vicinity, the geometrical relationship coincides with that of the X-ray tube, detector and projection axis for a view angle range of $-45° \leq view < 45°$ or a view angle range mainly including the range and also including its vicinity in the case in which the projection axis is defined as a straight line parallel to the x-axis direction of the reconstruction plane and passing through the center of reconstruction. Therefore, the addresses of the projection data D0 and the interpolation factors for obtaining one axially projected datum D1 can be used in common in these view angle ranges.

Furthermore, considering a case in which the projection axis is defined as a straight line parallel to the y-axis direction of the reconstruction plane and passing through the center of reconstruction, when the geometrical relationship of the X-ray tube, detector and projection axis is rotated by 90° around the center of reconstruction for a view angle range of $225° \leq view < 315°$ or a view angle range mainly including the range and also including its vicinity, the geometrical relationship coincides with that of the X-ray tube, detector and projection axis for a view angle range of $-45° \leq view < 45°$ or a view angle range mainly including the range and also including its vicinity in the case in which the projection axis is defined as a straight line parallel to the x-axis direction of the reconstruction plane and passing through the center of reconstruction. Therefore, the addresses of the projection data D0 and the interpolation factors for obtaining one axially projected datum D1 can be used in common in these view angle ranges.

In the backprojection method of the fifth aspect, since a table used for any one of a view angle range of $-45° \leq view < 45°$ or a view angle range mainly including the range and also including its vicinity, a view angle range of $135° \leq view < 225°$ or a view angle range mainly including the range and also including its vicinity, a view angle range of $45° \leq view < 135°$ or a view angle range mainly including the range and also including its vicinity, and a view angle range of $225° \leq view < 315°$ or a view angle range mainly including the range and also including its vicinity is used in common for other view angle ranges, the storage capacity required for the table is reduced.

The present invention, in accordance with its sixth aspect, provides the backprojection method of the aforementioned configuration, characterized in that the backprojection pixel data D2 are obtained by transformation calculation from the axially projected data D1.

The number of the axially projected data D1 is, for example, 8,000, and the number of the backprojection pixel data D2 is, for example, 512×512. Therefore, the effect of speedup is larger in simplifying the calculation for obtaining the backprojection pixel data D2 from the axially projected data D1 than in simplifying the calculation for obtaining the axially projected data D1 from the projection data D0.

In the backprojection method of the sixth aspect, since the backprojection pixel data D2 is obtained from the one axially projected datum D1, transformation calculation simpler than the interpolation calculation, involving only sampling at a regular pitch and multiplication by a distance factor is merely required, thus enhancing the effect of speedup.

The present invention, in accordance with its seventh aspect, provides the backprojection method of the aforementioned configuration, characterized in that parameters for said transformation calculation are set in a table.

Although the parameters for the transformation calculation may be calculated each time the one backprojection pixel datum D2 is to be obtained, the time of the calculation is an overhead.

In the backprojection method of the seventh aspect, this overhead is eliminated by calculating beforehand the parameters for the transformation calculation and setting them in a table.

The present invention, in accordance with its eighth aspect, provides the backprojection method of the aforementioned configuration, characterized in further comprising the steps of: obtaining one backprojection pixel datum D2 by transformation calculation from one axially projected datum D1; setting in a table parameters for the transformation calculation for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and using said table for other view angle ranges.

Considering a case in which the projection axis is defined as a straight line parallel to the x-axis direction of the reconstruction plane and passing through the center of reconstruction, when the geometrical relationship of the projection axis and reconstruction region is rotated by 180° around the center of reconstruction for a view angle range of 135°≦view<225° or a view angle range mainly including the range and also including its vicinity, the geometrical relationship coincides with that of the projection axis and reconstruction region for a view angle range of −45°≦view<45° or a view angle range mainly including the range and also including its vicinity. Therefore, the parameters for the transformation calculation for obtaining the backprojection pixel data D2 from the axially projected data D1 can be used in common in these view angle ranges.

Moreover, considering a case in which the projection axis is defined as a straight line parallel to the y-axis direction of the reconstruction plane and passing through the center of reconstruction, when the geometrical relationship of the projection axis and reconstruction region is rotated by −90° around the center of reconstruction for a view angle range of 45°≦view<135° or a view angle range mainly including the range and also including its vicinity, the geometrical relationship coincides with that of the projection axis and reconstruction region for a view angle range of −45°≦view<45° or a view angle range mainly including the range and also including its vicinity in the case in which the projection axis is defined as a straight line parallel to the x-axis direction of the reconstruction plane and passing through the center of reconstruction. Therefore, the parameters for the transformation calculation for obtaining the backprojection pixel data D2 from the axially projected data D1 can be used in common in these view angle ranges.

Furthermore, considering a case in which the projection axis is defined as a straight line parallel to the y-axis direction of the reconstruction plane and passing through the center of reconstruction, when the geometrical relationship of the projection axis and reconstruction region is rotated by 90° around the center of reconstruction for a view angle range of 225°≦view<315° or a view angle range mainly including the range and also including its vicinity, the geometrical relationship coincides with that of the projection axis and reconstruction region for a view angle range of −45°≦view<45° or a view angle range mainly including the range and also including its vicinity in the case in which the projection axis is defined as a straight line parallel to the x-axis direction of the reconstruction plane and passing through the center of reconstruction. Therefore, the parameters for the transformation calculation for obtaining the backprojection pixel data D2 from the axially projected data D1 can be used in common in these view angle ranges.

In the backprojection method of the eighth aspect, since a table used for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity is used in common for other view angle ranges, the storage capacity required for the table is reduced (for example, to ¼ in a 360° full scan).

The present invention, in accordance with its ninth aspect, provides the backprojection method of the aforementioned configuration, characterized in further comprising the steps of: separately conducting addition of the backprojection pixel data D2 for a view angle range of −45°≦view<45° or a view angle range mainly including the range and also including its vicinity and for a view angle range of 135°≦view<225° or a view angle range mainly including the range and also including its vicinity, and addition of the backprojection pixel data D2 for a view angle range of 45°≦view<135° or a view angle range mainly including the range and also including its vicinity and for a view angle range of 225°≦view<315° or a view angle range mainly including the range and also including its vicinity; and obtaining the backprojection data D3 by finally adding the sums from the additions.

When the projection axis is defined as a straight line parallel to the x-axis direction of the reconstruction plane and passing through the center of reconstruction, the processing is easier by a method involving the step of obtaining the backprojection pixel data D2 with the fixed y-coordinate and varying x-coordinate, and repeating the step with the varying y-coordinate. On the other hand, when the projection axis is defined as a straight line parallel to the y-axis direction of the reconstruction plane and passing through the center of reconstruction, the processing is easier by a method involving the step of obtaining the backprojection pixel data D2 with the fixed x-coordinate and varying y-coordinate, and repeating the step with the varying x-coordinate. However, this requires separate algorithms for these methods.

In the backprojection method of the ninth aspect, since addition of the backprojection pixel data D2 for a view angle range of −45°≦view<45° or a view angle range mainly including the range and also including its vicinity and for a view angle range of 135°≦view<225° or a view angle range mainly including the range and also including its vicinity, i.e., addition when the projection axis is defined as a straight line parallel to the x-axis direction of the reconstruction plane and passing through the center of reconstruction, is conducted separately from addition of the backprojection pixel data D2 for a view angle range of 45°≦view<135° or a view angle range mainly including the range and also including its vicinity and for a view angle range of 225°≦view<315° or a view angle range mainly including the range and also including its vicinity, i.e., addition when the projection axis is defined as a straight line parallel to the y-axis direction of the reconstruction plane and passing through the center of reconstruction, confusion of data is avoided when x and y are switched, and the algorithm can be used in common. It should be noted that when the backprojection data D3(x, y) is obtained by finally adding the sums from these additions, it is necessary to transform coordinates so that x and y match in the two sums.

The present invention, in accordance with its tenth aspect, provides an X-ray CT apparatus characterized in comprising: an X-ray tube; a detector for detecting X-rays of a fan beam; scanning means for collecting projection data D0(view, ch) represented by a view angle view and a detector channel ch while rotating at least one of said X-ray tube and said detector around a subject to be imaged; axially projected data calculating means for obtaining axially projected data D1 by projecting said projection data D0(view, ch) onto a straight projection axis; backprojection pixel data calculating means for obtaining backprojection pixel data D2 by projecting said axially projected data D1 onto pixels constituting a reconstruction region; and backprojection data calculating means for obtaining backprojection data D3 by adding the backprojection pixel data D2 for all views employed in image reconstruction on a pixel-to-pixel basis.

In the X-ray CT apparatus of the tenth aspect, the backprojection method of the first aspect can be suitably implemented.

The present invention, in accordance with its eleventh aspect, provides the X-ray CT apparatus of the aforementioned configuration, characterized in that when a direction of a center axis of the fan beam at view=0° is represented by a y-direction and a direction orthogonal to the y-direction and parallel to a fan beam plane is represented by an x-direction, said axially projected data calculating means defines said projection axis as a straight line passing through a center of reconstruction and parallel to the x-direction for a view angle range of −45°≦view<45° or a view angle range mainly including the range and also including its vicinity, and for a view angle range of 135°≦view<225° or a view angle range mainly including the range and also including its vicinity; and defines said projection axis as a straight line passing through the center of reconstruction and parallel to the y-direction for a view angle range of 45°≦view<135° or a view angle range mainly including the range and also including its vicinity, and for a view angle range of 225°≦view<315° or a view angle range mainly including the range and also including its vicinity.

In the X-ray CT apparatus of the eleventh aspect, the backprojection method of the second aspect can be suitably implemented.

The present invention, in accordance with its twelfth aspect, provides the X-ray CT apparatus of the aforementioned configuration, characterized in that said axially projected data calculating means obtains one axially projected datum D1 by interpolation calculation from a plurality of projection data D0.

In the X-ray CT apparatus of the twelfth aspect, the backprojection method of the third aspect can be suitably implemented.

The present invention, in accordance with its thirteenth aspect, provides the X-ray CT apparatus of the aforementioned configuration, characterized in that said axially projected data calculating means uses a table in which addresses of the plurality of projection data D0 and interpolation factors for obtaining the one axially projected datum D1 are set.

In the X-ray CT apparatus of the thirteenth aspect, the backprojection method of the fourth aspect can be suitably implemented.

The present invention, in accordance with its fourteenth aspect, provides the X-ray CT apparatus of the aforementioned configuration, characterized in that said axially projected data calculating means obtains one axially projected datum D1 by interpolation calculation from a plurality of projection data D0; sets in a table addresses of the plurality of projection data D0 and interpolation factors for obtaining the one axially projected datum D1 for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and uses said table for other view angle ranges.

In the X-rav CT apparatus of the fourteenth aspect, the backprojection method of the fifth aspect can be suitably implemented.

The present invention, in accordance with its fifteenth aspect, provides the X-ray CT apparatus of the aforementioned configuration, characterized in that said pixel projection data calculating means obtains the backprojection pixel data D2 by transformation calculation from the axially projected data D1.

In the X-ray CT apparatus of the fifteenth aspect, the backprojection method of the sixth aspect can be suitably implemented.

The present invention, in accordance with its sixteenth aspect, provides the X-ray Cr apparatus of the aforementioned configuration, characterized in that said pixel projection data calculating means uses a table in which parameters for said transformation calculation are set.

In the X-ray Cf apparatus of the sixteenth aspect, the backprojection method of the seventh aspect can be suitably implemented.

The present invention, in accordance with its seventeenth aspect, provides the X-ray CT apparatus of the aforementioned configuration, characterized in that said pixel projection data calculating means obtains one backprojection pixel datum D2 by transformation calculation from one axially projected datum D1; sets in a table parameters for the transformation calculation for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity,1 and a view angle range of 225°≦view<315° or a view angle range mainly including the range and also including its vicinity; and uses said table for other view angle ranges.

In the X-ray CT apparatus of the seventeenth aspect, the backprojection method of the eighth aspect can be suitably implemented.

The present invention, in accordance with its eighteenth aspect, provides the X-ray CT apparatus of the aforementioned configuration, characterized in that said backprojection data calculating means separately conducts addition of the backprojection pixel data D2 for a view angle range of −45°≦view<45° or a view angle range mainly including the range and also including its vicinity and for a view angle range of 135°≦view<225° or a view angle range mainly including the range and also including its vicinity, and addition of the backprojection pixel data D2 for a view angle range of 45°≦view<135° or a view angle range mainly including the range and also including its vicinity and for a view angle range of 225°≦view<315° or a view angle range mainly including the range and also including its vicinity; and obtains the backprojection data D3 by finally adding the sums from the additions.

In the X-ray CT apparatus of the eighteenth aspect, the backprojection method of the ninth aspect can be suitably implemented.

According to the backprojection method and X-ray CT apparatus of the present invention, since axially projected data D1(view, pt) are first obtained from projection data D0(view, ch), and then backprojection pixel data D2(x, y) are obtained from the axially projected data D1(view, pt), instead of obtaining the backprojection pixel data D2(x, y) directly from the projection data D0(view, ch), the backprojection processing can be simplified and sped up.

Further objects and advantages of the present invention will be apparent from the following description of the preferred embodiments of the invention as illustrated in the accompanying drawings.

BRIEF DESCRIPTION OF THE DRAWINGS

FIG. 2 shows an exemplary lookup table for calculating axially projected data.

FIG. 3 shows an exemplary lookup table for calculating backprojection pixel data.

FIG. 19 shows an exemplary lookup table for calculating axially projected data in accordance with a third embodiment.

DETAILED DESCRIPTION OF THE INVENTION

The present invention will now be described in more detail with reference to embodiments shown in the accompanying drawings. It should be noted that the present invention is not limited to the embodiments.

First Embodiment

Figure 1:
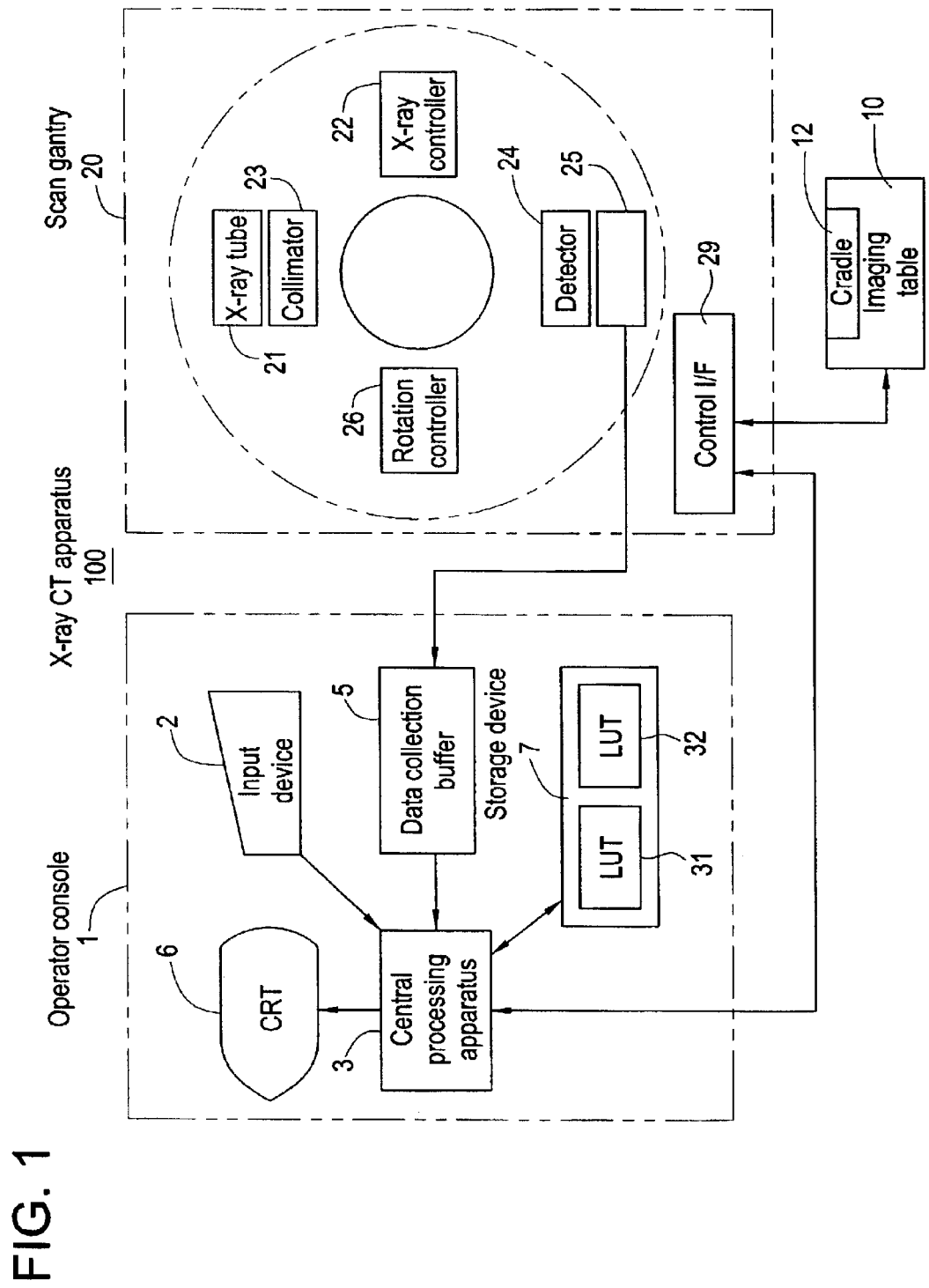
FIG. 1 is a block diagram showing an X-ray CT apparatus in accordance with a first embodiment of the present invention.

FIG. 1 is a block diagram of the configuration of an X-ray CT apparatus in accordance with a first embodiment of the present invention.

The X-ray CT apparatus 100 comprises an operator console 1, an imaging table 10, and a scan gantry 20.

The operator console 1 comprises an input device 2 for accepting inputs by a human operator, a central processing apparatus 3 for executing backprojection processing in accordance with the present invention, a data collection buffer 5 for collecting projection data acquired at the scan gantry 20, a CRT 6 for displaying an X-ray CT image reconstructed from the projection data, and a storage device 7 for storing programs, data, and X-ray CT images.

The table apparatus 10 comprises a cradle 12 for laying thereon a subject and transporting the subject into/out of a bore (internal cavity portion) of the scan gantry 20. The cradle 12 is driven by a motor incorporated in the table apparatus 10.

The scan gantry 20 comprises an X-ray tube 21, an X-ray controller 22, a collimator 23, a detector 24, a DAS (data acquisition system) 25, a rotation controller 26 for rotating the X-ray tube etc. around the body axis of the subject, and a control interface 29 for communicating control signals etc. with the operator console 1 and imaging table 10.

FIG. 2 is a conceptual diagram of a lookup table 31 stored in the storage device 7 for axial projection.

In the lookup table 31, a coordinate pt of axially projected data D1 on a projection axis for each view angle view in a view angle range of $-45° \leq \text{view} < 45°$ (or a view angle range mainly including the range and also including its vicinity), an address of projection data D0, i.e., a channel index ch(pt), for obtaining the axially projected data D1(view, pt), and interpolation factors k1(pt) and k2(pt) for two-point interpolation are calculated beforehand and stored.

The symbol $\Delta\text{view}$ is a step angle for the view angle (i.e., the view angle difference between adjacent views), and is "0.36°", for example. The symbol Pe is the maximum of pt, and is "8,000", for example.

FIG. 3 is a conceptual diagram of a lookup table 32 stored in the storage device 7 for transformation calculation.

In the lookup table 32, a y-coordinate y of backprojection pixel data D2 for each view angle view, in a view angle range of $-45° \leq \text{view} < 45°$ (or a view angle range mainly including the range and also including its vicinity), a distance factor R(y) as a parameter of the transformation calculation for obtaining one backprojection pixel datum D2(y, x) from one axially projected datum D1, a sampling pitch $\Delta\text{pt}$, the number of sampling points str_pt, a start address str_x, and an end address end_x are calculated beforehand and stored. These parameters will be described later with reference to FIG. 11.

Figure 6:
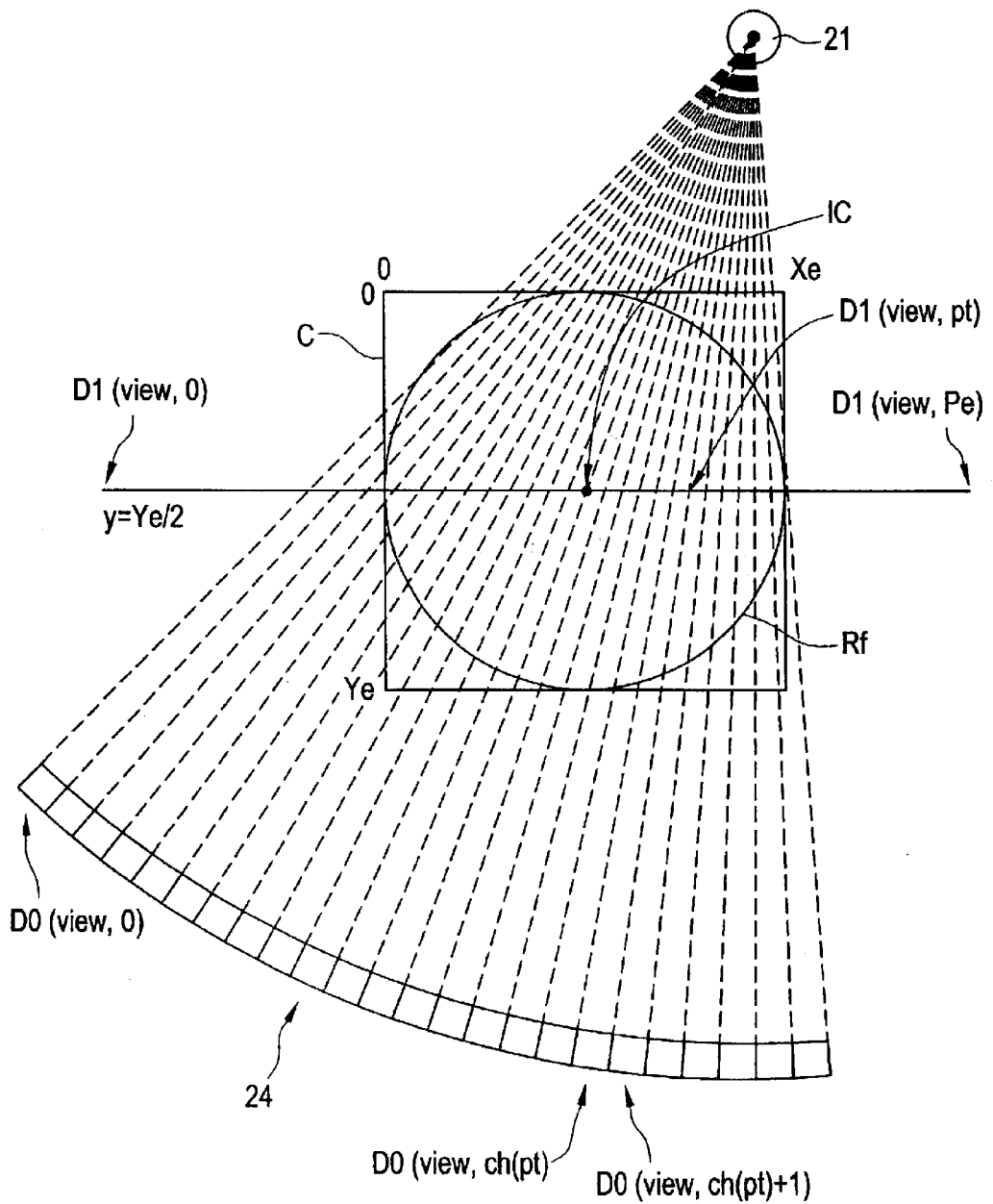
FIG. 6 is a diagram for explaining processing for obtaining axially projected data from projection data in a range of $-45° \leq \text{view} < 45°$.

The symbol Ye is the maximum of the y-coordinate in a reconstruction region Rf, as shown in FIG. 6.

Figure 4:
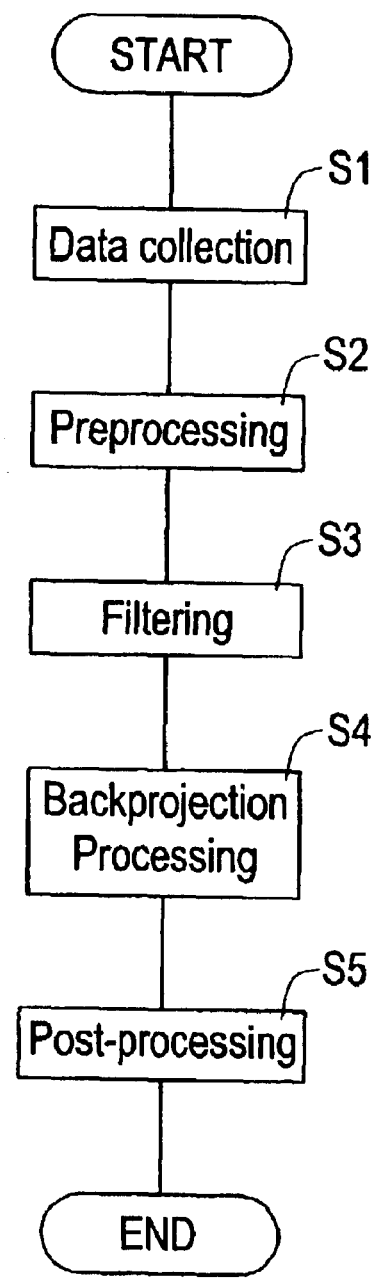
FIG. 4 is a general flow chart of operation of the X-ray CT apparatus.

FIG. 4 is a flow chart showing the general flow of the operation of the X-ray CT apparatus 100.

In Step S1, projection data D0(view, ch) represented by the view angle view and the detector channel ch are collected while rotating the X-ray tube 21 and detector 24 around the subject to be imaged.

In Step 52, preprocessing (e.g., offset correction, DAS gain correction, and sensitivity correction) is performed on the projection data D0(view, ch).

In Step S3, filtering is performed on the preprocessed projection data D0(view, ch). Specifically, the data is Fourier-transformed, is filtered (subjected to a reconstruction function), and is inversely Fourier-transformed.

In Step S4, backprojection processing is performed on the filtered projection data D0(view, ch) in accordance with the present invention to obtain backprojection data D3(x, y). The backprojection processing is described below with reference to FIG. 5.

In Step S5, post-processing is performed on the backprojection data D3(x, y) to produce a CT image.

Figure 5:
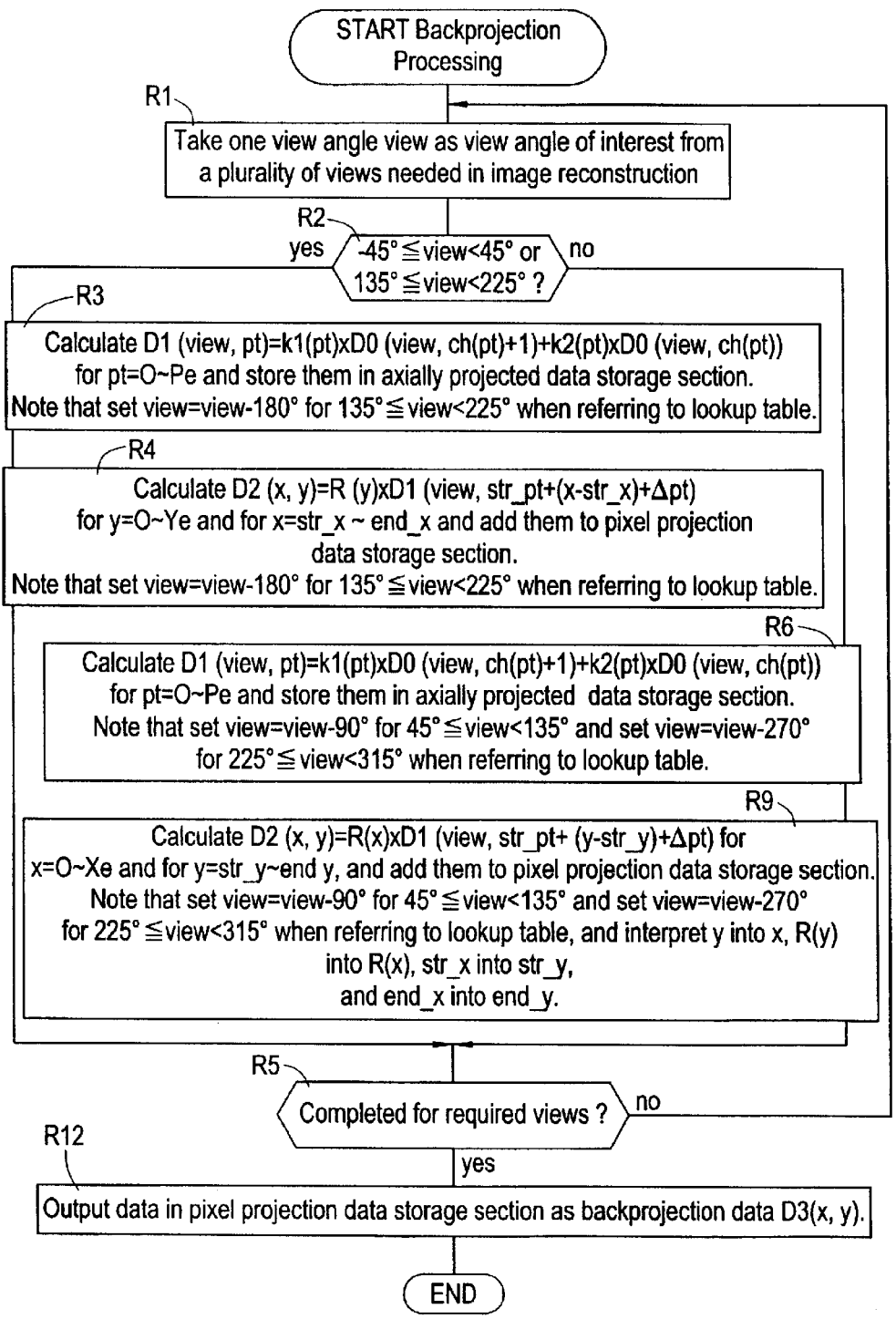
FIG. 5 is a flow chart of backprojection processing in accordance with the first embodiment.

FIG. 5 is a detailed flow chart of the backprojection processing (S4).

In Step R1, one view angle view is taken as a view angle of interest from a plurality of views needed in image reconstruction.

In Step R2, if the view angle of interest view is −45°≦view<45° or 135°≦view<225°, the process goes to R3; otherwise (i.e., if it is 45°≦view<135° or 225°≦view<315°, goes to Step R6.

In Step R3, a lookup table 31 corresponding to a view angle view is referred to, to first obtain a channel index ch(0) corresponding to pt=0, and then retrieve the filtered projection data D0(view, ch(0)+1) and D0(view, ch(0)) for two-point interpolation. In addition, interpolation factors k1(0) and k2(0) are read out. Then, axially projected data D1(view, 0) is calculated according to the following equation, and is stored in the storage device 7:

D1(view, 0)=k1(0)×D0(view, ch(0)+1)+k2(0)×D0(view, ch(0)).

Similarly, axially projected data D1(view, pt) are calculated for pt=1–Pe according to the following equation:

D1(view, pt)=k1(pt)×D0(view, ch(pt)+1)+k2(pt)×D0(view, ch(pt)).

If ch(pt) is not defined for a certain pt, this pt is skipped and the next pt is taken.

Moreover, for 135°≦view<225°, a lookup table 31 corresponding to a view angle view=view−180° is referred to.

FIG. 6 is an explanatory diagram showing details of Step R3.

Step R3 is calculation processing for obtaining axially projected data D1(view, pt) lining up along a projection axis represented by a straight line y=Ye/2 parallel to the x-axis direction of a reconstruction plane and passing through a center of reconstruction IC, from projection data D0(view, ch) lining up at arc-shaped geometrical positions corresponding to the arc-like shape of the detector 24. The symbol Ye designates the maximum of the y-coordinate of the reconstruction region Rf.

Figure 7:
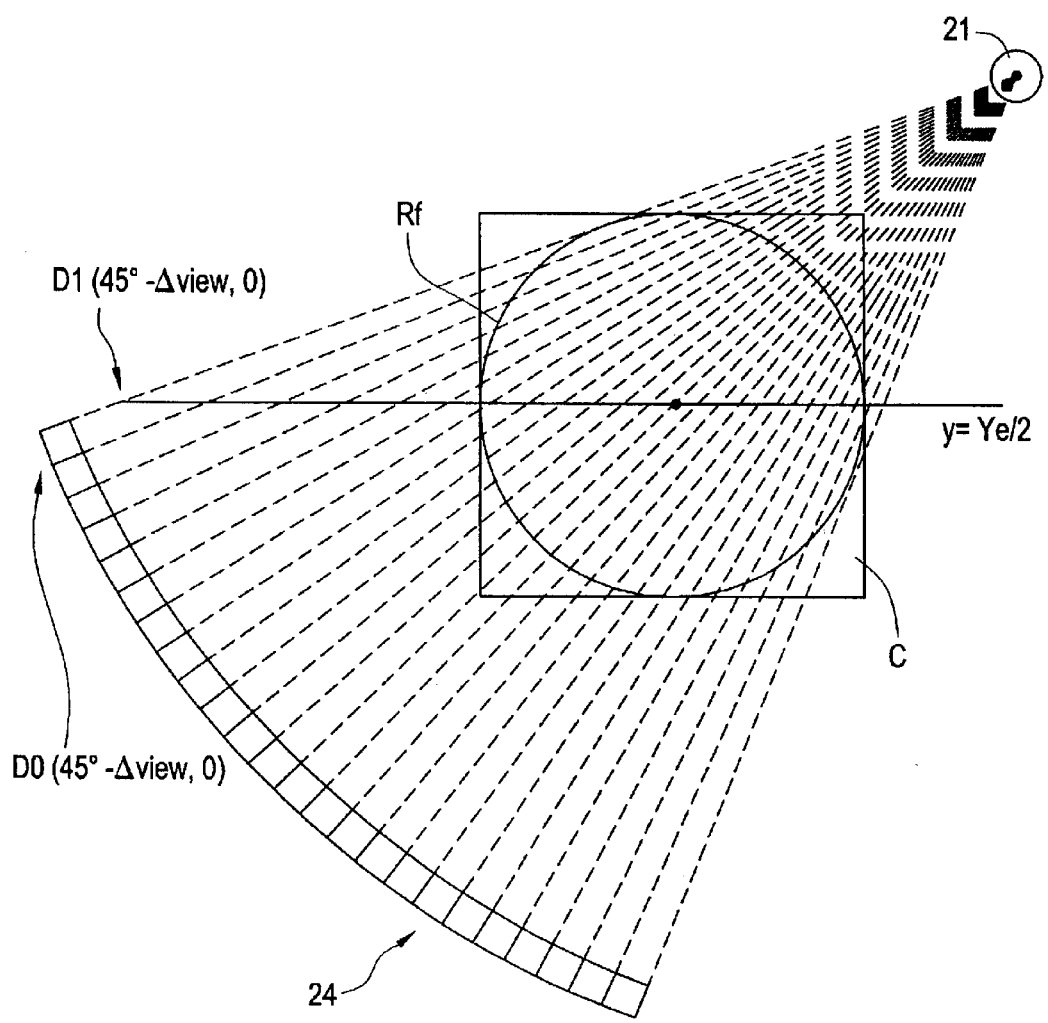
FIG. 7 is a diagram for explaining processing for obtaining axially projected data from projection data at view=$45°$–$\Delta\text{view}$.

The position of the axially projected data D1(view, 0) is defined by the position of the channel index ch(0) of the detector at a view angle view=45°−Δview, as shown in FIG. 7. Note that view=0° when the center axis direction of the fan beam is parallel to the y-axis direction, and the view angle step is represented by Δview.

Figure 8:
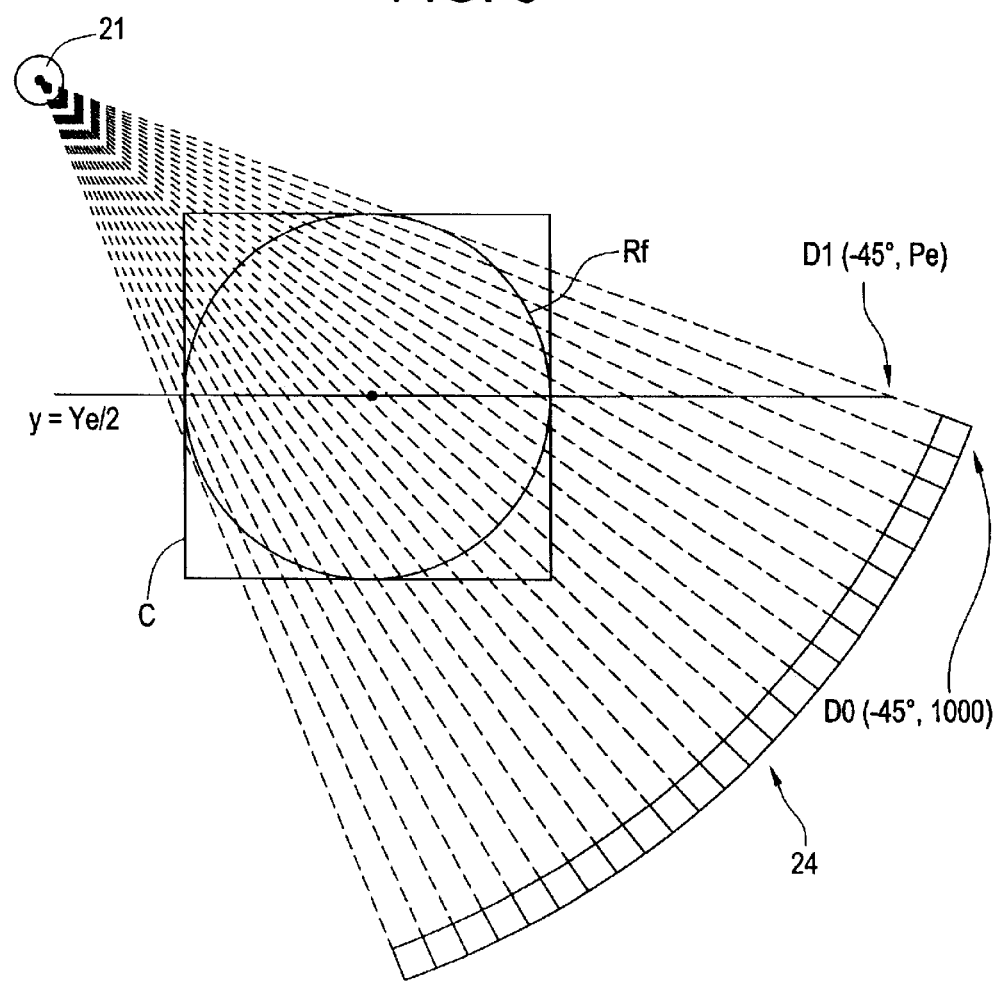
FIG. 8 is a diagram for explaining processing for obtaining axially projected data from projection data at view=$45°$.

On the other hand, the position of the axially projected data D1(view, Pe) is defined by the position of the channel index ch(1,000) of the detector at a view angle view=−45°, as shown in FIG. 8. Note that the detector 24 has 1,000 channels here.

As can be seen from FIGS. 6–8, one view has a projection axis portion contained in the fan beam and a projection axis portion not contained in the fan beam. No value of ch(pt) is set in the lookup table 31 for pt corresponding to a projection axis portion not contained in the fan beam.

Returning to FIG. 5, in Step R4, a lookup table 32 corresponding to a view angle view is referred to, to first obtain Δpt, str_pt and str_x for y=0, set x=str_x, and then retrieve axially projected data D1(view, str_pt) from the storage device 7. In addition, a distance factor R(y) is read out. Then, backprojection pixel data D2(view, str_x, 0) is calculated according to the following equation:

D2(view, str_x, 0)=R(0)×D1(view, str_pt).

The data is added to D2(x, y) stored in the storage device 7:

$$D2(\text{str\_x}, 0) = \sum_{view} D2(view, \text{str\_x}, 0).$$

Similarly, backprojection pixel data D2(view, x, 0) are calculated for x=str_x+1−end_x, and added to the backprojection pixel data D2(x, 0) stored in the storage device 7 according to the following equations:

D2(view, x, 0)=R(0)×D1(view, str_pt+(x−str_x)Δpt), and $$D2(x, 0) = \sum_{view} D2(view, x, 0).$$

Next, backprojection pixel data D2(view, x, y) are similarly calculated for y=1–Ye, and added to the backprojection pixel data D2(x, y) stored in the storage device 7 according to the following equations:

D2(view, x, y)=R(y)×D1(view, str_pt+(x−str_x)Δpt), and $$D2(x, y) = \sum_{view} D2(view, x, y).$$

For 135°≦view<225°, a lookup table 32 corresponding to a view angle view=view−180° is referred to.

Then, the process goes to Step R5.

Figure 9:
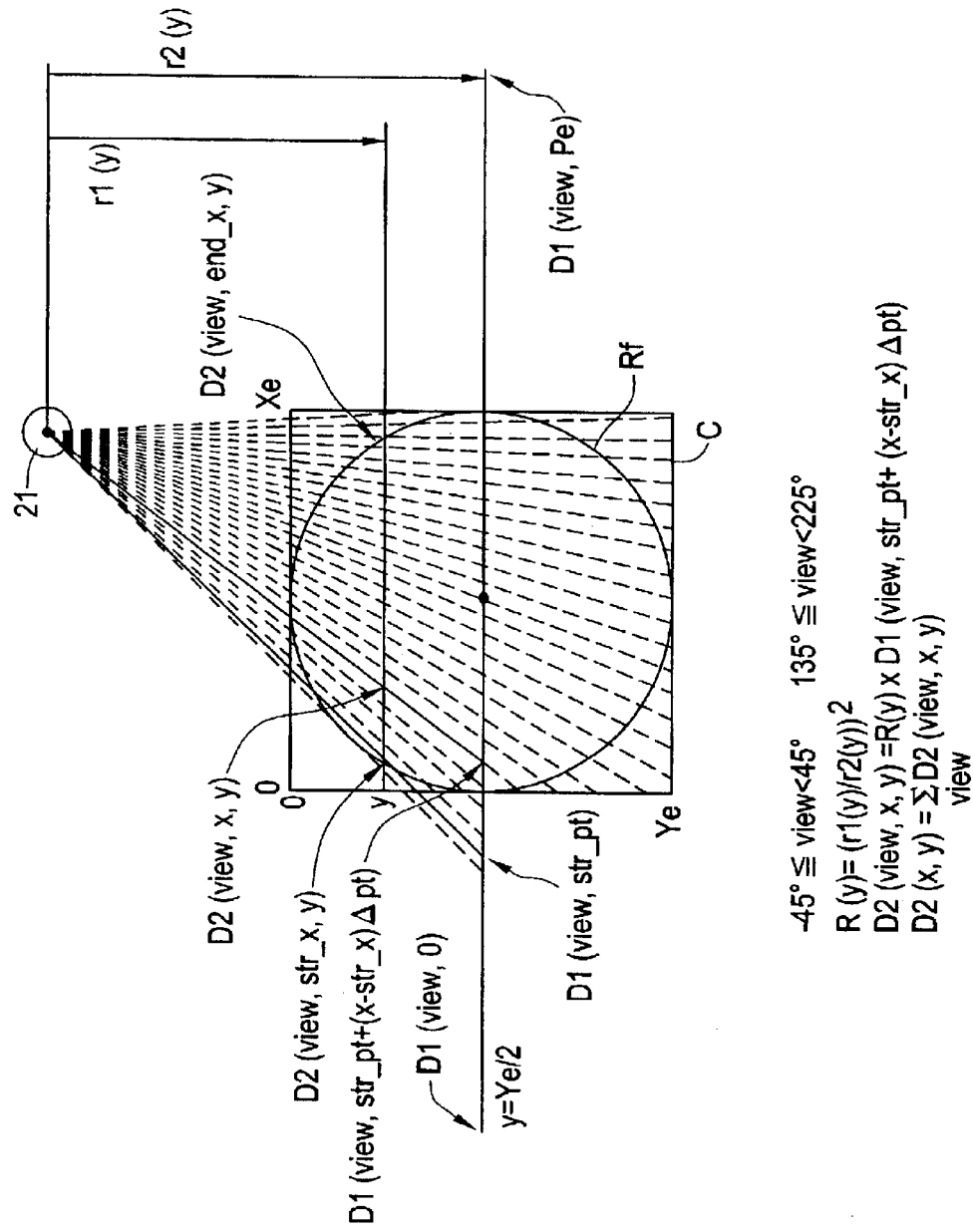
FIG. 9 is a diagram for explaining processing for obtaining backprojection pixel data from axially projected data in a range of $-45° \leq \text{view} < 45°$.

FIG. 9 is an explanatory diagram showing details of Step R4.

Backprojection pixel data D2 is calculated along a straight line parallel to the x-axis from the axially projected data D1 on the projection axis y=Ye/2, and this process is repeated for Y=0–Ye.

Figure 10:
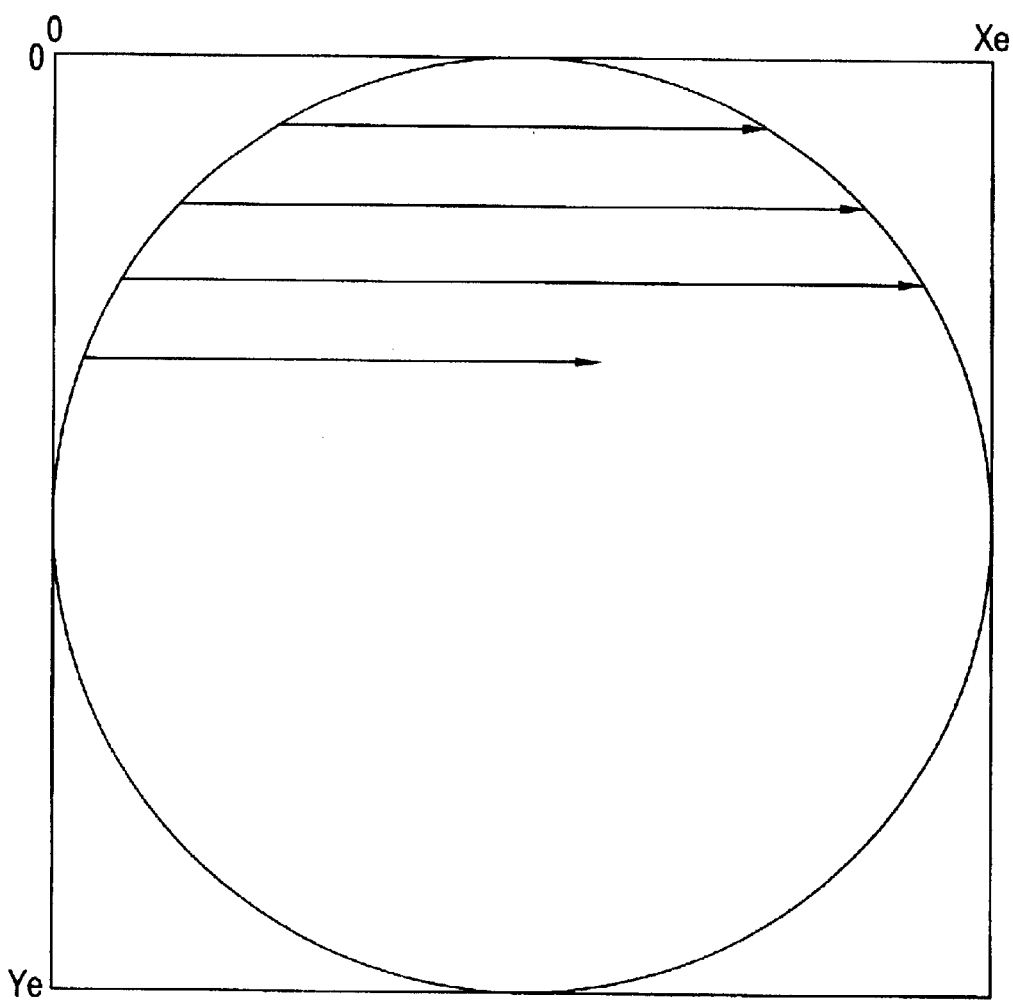
FIG. 10 is a diagram for explaining processing for adding backprojection pixel data in ranges of $-45° \leq \text{view} < 45°$ and $135° \leq \text{view} < 225°$.

FIG. 10 is a conceptual diagram of a backprojection pixel data storage section 70 in the storage device 7.

The backprojection pixel data D2 is added along a straight line parallel to the x-axis, and this process is repeated for Y=0–Ye.

In Step R6, if the view angle falls within 45°≦view<135°, a lookup table 31 corresponding to a view angle view=view−90° is referred to, and if the view angle falls within 225°≦view<315°, a lookup table 31 corresponding to a view angle view=view−270° is referred to. Then, axially projected data D1(view, pt) are calculated for pt=0–Pe similarly to Step R3 according to the following equation:

D1(view, pt)=k1(pt)×D0(view, ch(pt)+1)+k2(pt)×D0(view, ch(pt)).

If ch(pt) is not defined for a certain pt, this pt is skipped and the next pt is taken.

Figure 11:
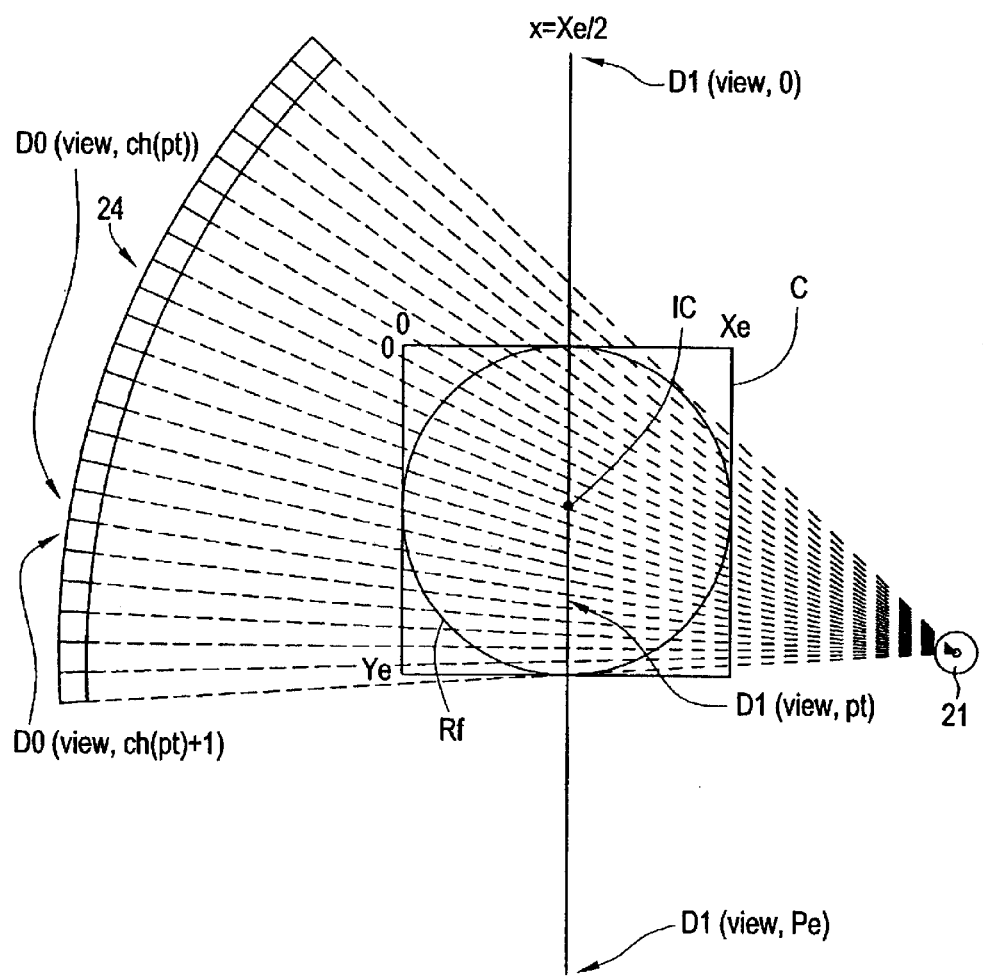
FIG. 11 is a diagram for explaining processing for obtaining axially projected data from projection data in a range of $45° \leq \text{view} < 135°$.

FIG. 11 is an explanatory diagram showing details of Step R6.

Step R6 corresponds to calculation for obtaining axially projected data D1(view, pt) lining up along a projection axis represented by a straight line x=Xe/2 parallel to the y-axis direction and passing through the center of reconstruction IC, from projection data D0(view, ch) lining up at arc-shaped geometrical positions corresponding to the arc-like shape of the detector 24. The symbol Xe designates the maximum of the x-coordinate of the reconstruction region Rf.

Returning to FIG. 5, in Step R9, if the view angle falls within $45° \leq \text{view} < 135°$, a lookup table 32 corresponding to a view angle view=view$-90°$ is referred to, and if the view angle falls within $225° \leq \text{view} < 315°$, a lookup table 32 corresponding to a view angle view=view$-270°$ is referred to. At that time, interpretation of y into x, R(y) into R(x), str_x into str_y, and end_x into end_y is conducted, and backprojection pixel data D2(view, x, y) are calculated for x=0–x=Xe and for y=str_y–end_y, and added to the backprojection pixel data D2(x, y) stored in the storage device 7 according to the following equations:

$$D2(\text{view}, x, y) = R(y) \times D1(\text{view}, str\_pt + (y - str\_y)\Delta pt), \text{ and}$$

$$D2(x, y) = \sum_{view} D2(view, x, y).$$

Then, the process goes to Step R5.

Figure 12:
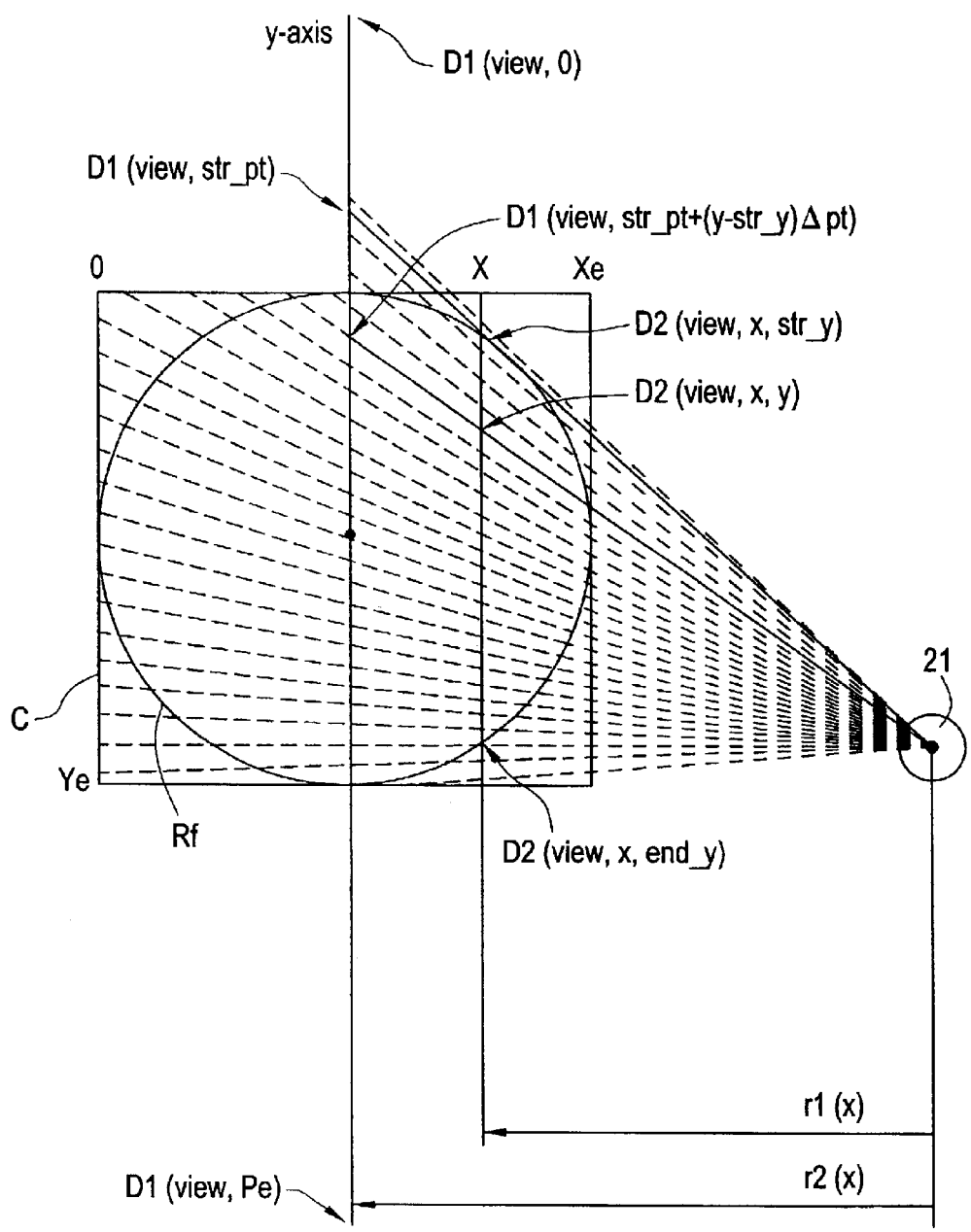
FIG. 12 is a diagram for explaining processing for obtaining backprojection pixel data from axially projected data in a range of $45° \leq \text{view} < 135°$.

FIG. 12 is an explanatory diagram showing details of Step R9.

Backprojection pixel data D2 is calculated along a straight line parallel to the y-axis from the axially projected data D1 on the projection axis x=Xe/2, and this process is repeated for X=0–Xe.

Figure 13:
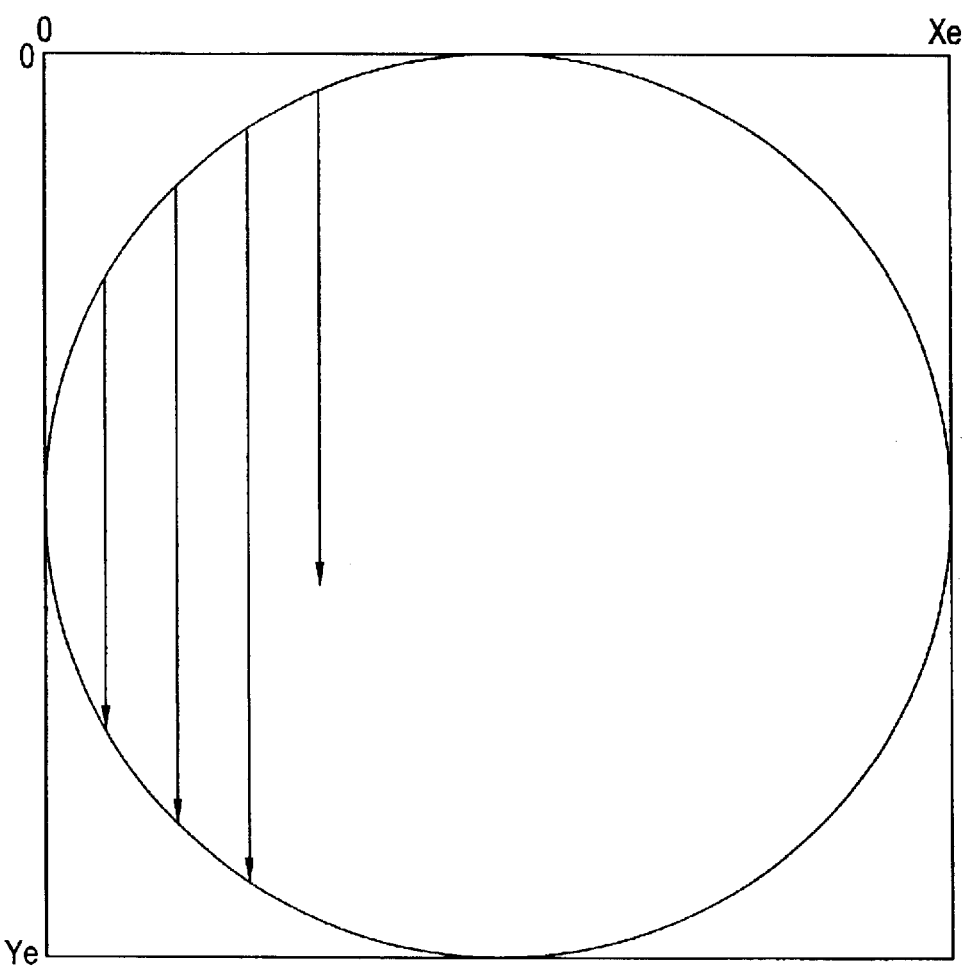
FIG. 13 is a diagram for explaining processing for adding backprojection pixel data in ranges of $45° \leq \text{view} < 135°$ and $225° \leq \text{view} < 315°$.

FIG. 13 is a conceptual diagram of the backprojection pixel data storage section 70 in the storage device 7.

The backprojection pixel data D2 is added along a straight line parallel to the y-axis, and this process is repeated for X=0–Xe.

Returning to FIG. 5, in Step R5, if Steps R1–R9 have not been repeated for all views needed in image reconstruction, the process goes back to Step R1; and if Steps R1–R9 have been repeated for all views needed in image reconstruction, the process goes to Step R12.

In Step R12, data acquired in the backprojection pixel data storage section 70 are output as backprojection data D3(x, y).

The backprojection processing is then terminated.

According to the X-ray CT apparatus 100 of the first embodiment, the backprojection processing can be simplified and sped up. Moreover, in Steps R3, R4, R6 and R9, the lookup tables 31 and 32 can be used in common, although interpretation of view angles and parameters for the transformation calculation is needed. Furthermore, only one backprojection pixel data storage section 70 is needed, although interpretation of parameters is needed in Step R9. (Two backprojection pixel data storage sections are required in the second embodiment.)

Second Embodiment

In the second embodiment, addition of the backprojection pixel data D2 for a view angle range of $-45° \leq \text{view} < 45°$ (or a view angle range mainly including the range and also including its vicinity) and for a view angle range of $135° \leq \text{view} < 225°$ (or a view angle range mainly including the range and also including its vicinity) is conducted separately from addition of the backprojection pixel data D2 for a view angle range of $45° \leq \text{view} < 135°$ (or a view angle range mainly including the range and also including its vicinity) and for a view angle range of $225° \leq \text{view} < 315°$ (or a view angle range mainly including the range and also including its vicinity), and the backprojection data D3(x, y) are obtained by finally adding the sums from the additions.

Figure 14:
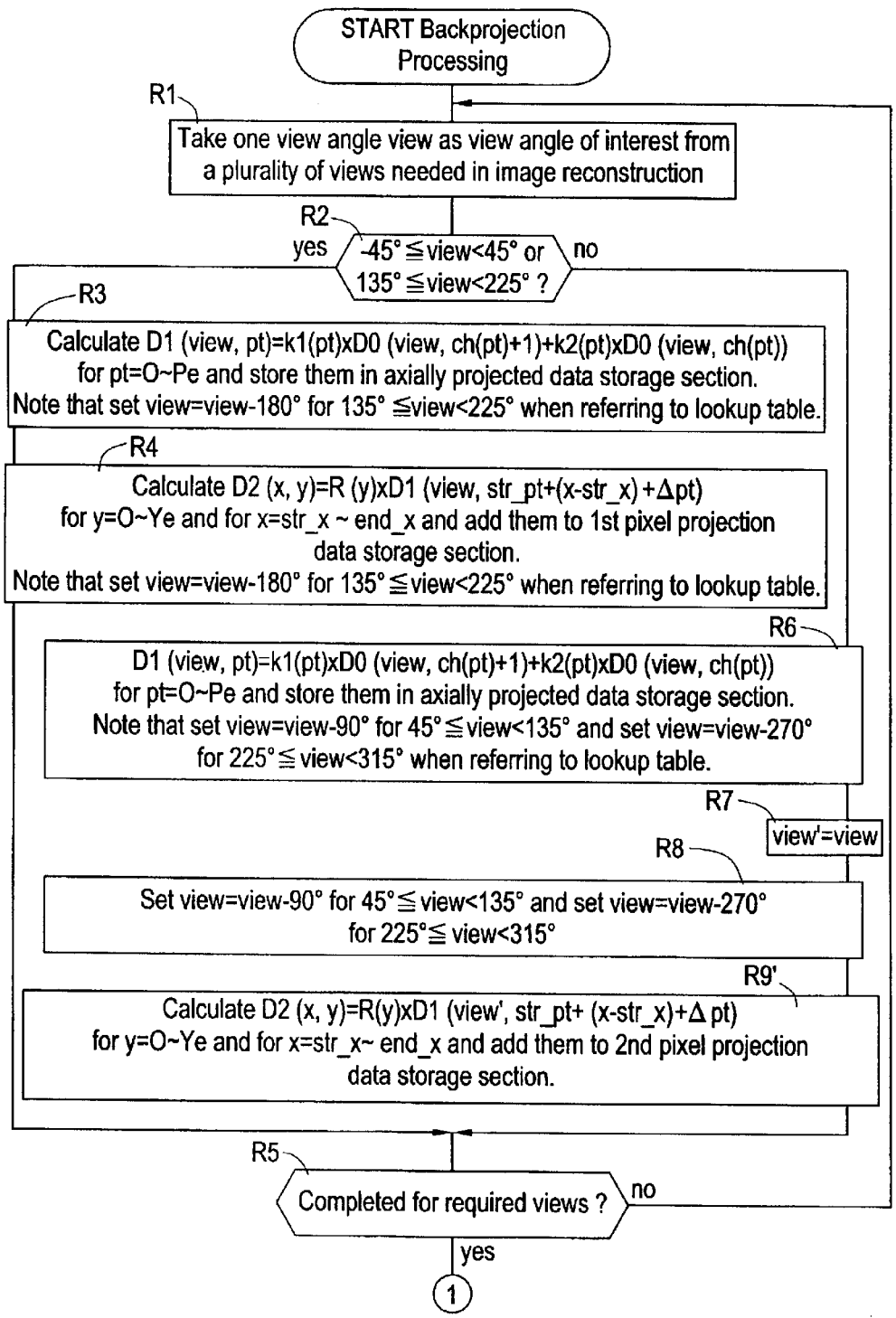
FIG. 14 is a flow chart of backprojection processing in accordance with a second embodiment.
Figure 15:
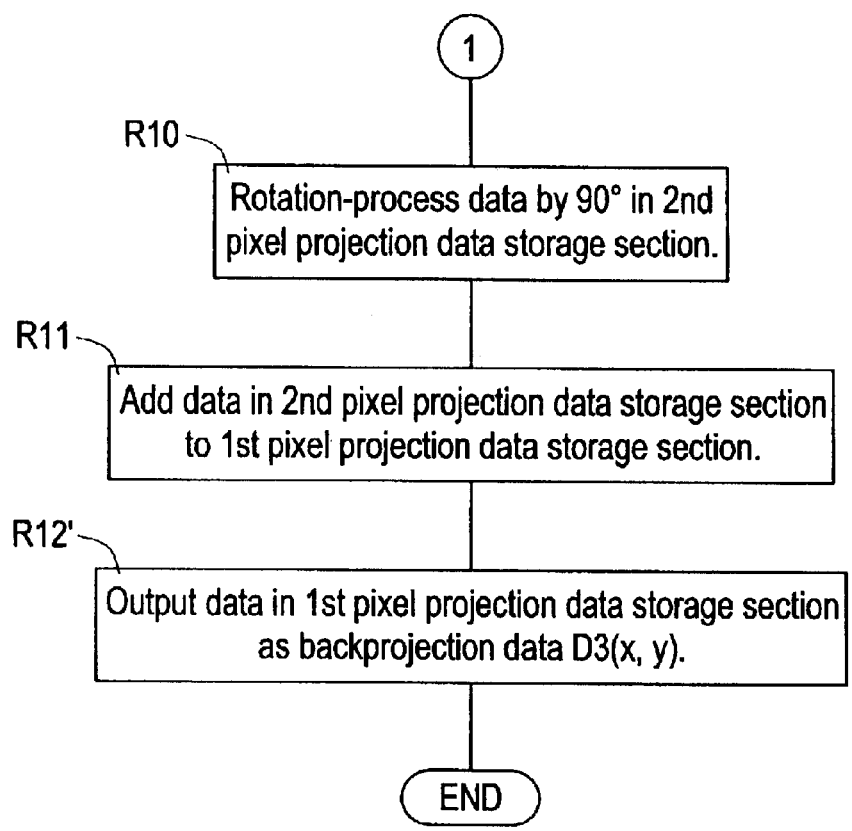
FIG. 15 is a flow chart continued from FIG. 14.

FIGS. 14 and 15 are flow charts showing backprojection processing in accordance with the second embodiment.

In Step R1 in FIG. 14, one view angle view is taken as a view angle of interest from a plurality of views needed for image reconstruction.

In Step R2, if the view angle of interest view is $-45° \leq \text{view} < 45°$ or $135° \leq \text{view} < 225°$, the process goes to R3; otherwise (i.e., if it is $45° \leq \text{view} < 135°$ or $225° \leq \text{view} < 315°$, goes to Step R6.

In Step R3, a lookup table 31 corresponding to a view angle view is referred to, to calculate axially projected data D1(view, pt) for pt=0–Pe according to the following equation:

$$D1(\text{view}, pt) = k1(pt) \times D0(\text{view}, ch(pt)+1) + k2(pt) \times D0(\text{view}, ch(pt)).$$

If ch(pt) is not defined for a certain pt, this pt is skipped and the next pt is taken.

Moreover, for $135° \leq \text{view} < 225°$, a lookup table 31 corresponding to a view angle view=view$-180°$ is referred to.

Figure 16:
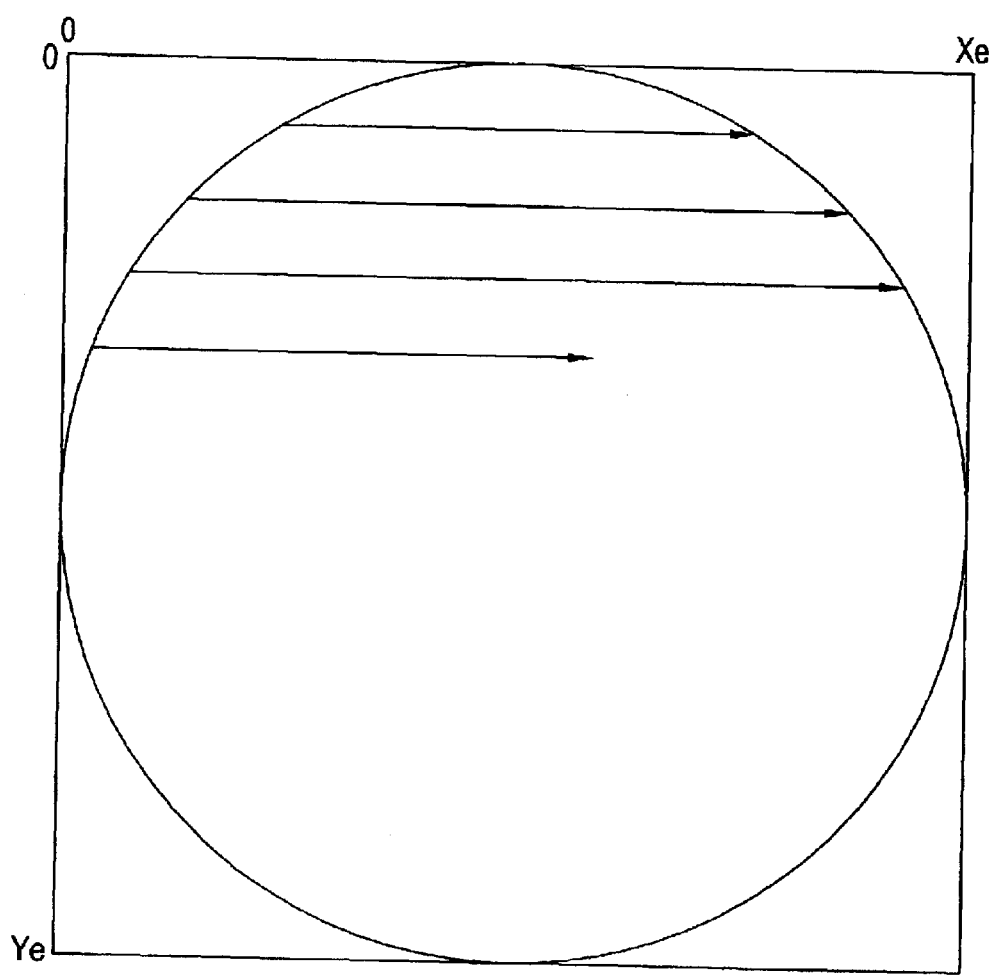
FIG. 16 is a diagram for explaining processing for adding backprojection pixel data in ranges of $-45° \leq \text{view} < 45°$ and $135° \leq \text{view} < 225°$.

In Step R4', a lookup table 32 corresponding to a view angle view is referred to, and backprojection pixel data D2(view, x, y) are calculated for a range y=0–y=Ye, and for x=str_x–end_x, and added to backprojection pixel data D2(x, y) stored in a first backprojection pixel data storage section 71 shown in FIG. 16 in the storage device 7, according to the following equations:

$$D2(\text{view}, x, y) = R(y) \times D1(\text{view}, str\_pt + (x - str\_x)\Delta pt), \text{ and}$$

$$D2(x, y) = \sum_{view} D2(view, x, y).$$

For $135° \leq \text{view} < 225°$, a lookup table 32 corresponding to a view angle view=view$-180°$ is referred to.

The process then goes to Step R5.

FIG. 16 is a conceptual diagram of the first backprojection pixel data storage section 71.

The backprojection pixel data D2 is added along a straight line parallel to the x-axis, and this process is repeated for y=0–Ye.

Returning to FIG. 14, in Step R6, if the view angle falls within $45° \leq \text{view} < 135°$, a lookup table 31 corresponding to a view angle view=view$-90°$ is referred to, and if the view angle falls within $225° \leq \text{view} < 315°$, a lookup table 31 corresponding to a view angle view=view$-270°$ is referred to. Then, axially projected data D1(view, pt) are calculated for pt=0–Pe similarly to Step R3 according to the following equation:

$$D1(\text{view}, pt) = k1(pt) \times D0(\text{view}, ch(pt)+1) + k2(pt) \times D0(\text{view}, ch(pt)).$$

If ch(pt) is not defined for a certain pt, this pt is skipped and the next pt is taken.

In Step R7, the current view is saved in view'.

In Step R8, if the view angle falls within $45° \leq \text{view} < 135°$, the view angle is set to view=view$-90°$, and if the view angle falls within $225° \leq \text{view} < 315°$, the view angle is set to view=view$-270°$.

Figure 17:
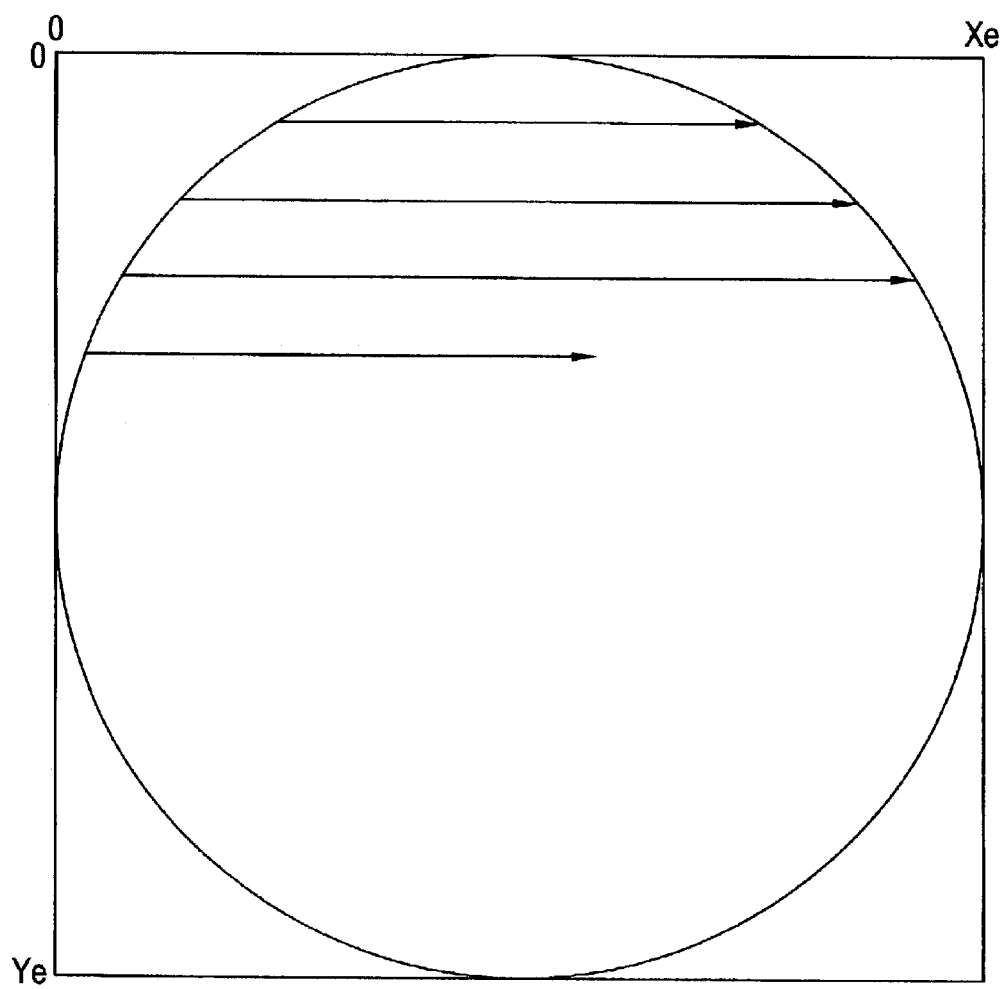
FIG. 17 is a diagram for explaining processing for adding backprojection pixel data in ranges of $45° \leq \text{view} < 135°$ and $225° \leq \text{view} < 315°$.
Figure 18:
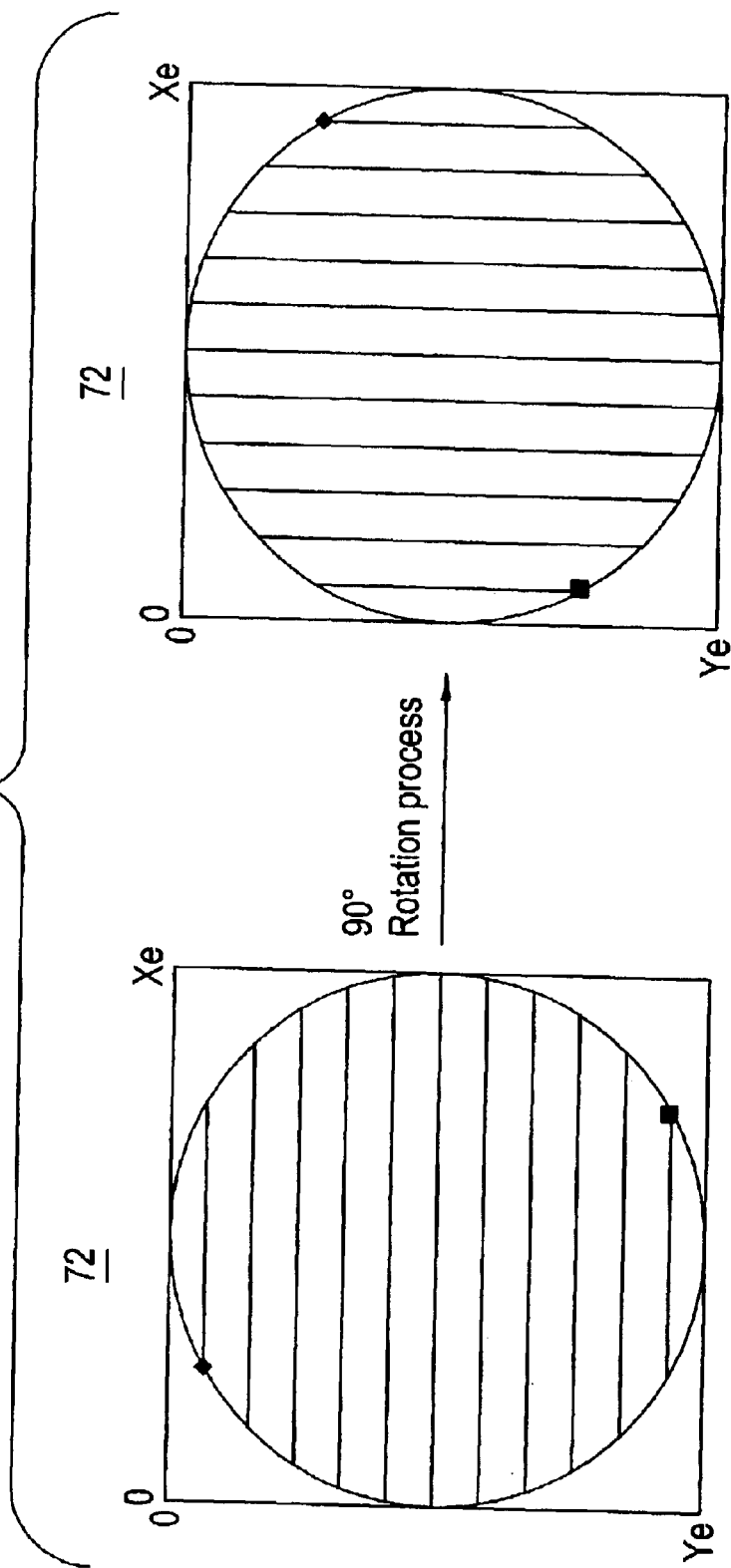
FIG. 18 is a diagram for explaining $90°$ rotation processing of data.

In Step R9', a lookup table 32 corresponding to a view angle view is referred to, and backprojection pixel data D2(view, x, y) are calculated for a range y=0–y=Ye, and for x=str_x–end_x and added to backprojection pixel data D2(x, y) stored in a second backprojection pixel data storage section 72 shown in FIG. 17 in the storage device 7 according to the following equations:

$$D2(\text{view}', x, y) = R(y) \times D1(\text{view}', \text{str\_pt} + (x\_\text{str}\_x)\Delta pt), \text{ and}$$

$$D2(x, y) = \sum_{\text{view}} D2(\text{view}', x, y).$$

The process then goes to Step R5.

FIG. 17 is a conceptual diagram of the second backprojection pixel data storage section 72.

The backprojection pixel data D2 is added along a straight line parallel to the x-axis, and this process is repeated for y=0–Ye.

Returning to FIG. 14, in Step R5, if Steps R1–R9' have not been repeated for all views needed in image reconstruction, the process goes back to Step R1; and if Steps R1–R9' have been repeated for all views needed in image reconstruction, the process goes to Step R10 in FIG. 15.

In Step R10 in FIG. 15, the data in the second backprojection pixel data storage section 72 is rotation-processed by 900.

In Step R11, the data in the second backprojection pixel data storage section 72 rotation-processed by 90° are added to the data in the first backprojection pixel data storage section 71.

In Step R12', data acquired in the pixel projection data storage section 71 are output as backprojection data D3(x, y).

The backprojection processing is then terminated.

According to the X-ray CT apparatus of the second embodiment, the backprojection processing can be simplified and sped up. Moreover, in Steps R3, R4', R6 and R9', the lookup tables 31 and 32 can be used in common, although interpretation of view angles and parameters for the transformation calculation are needed. Furthermore, the need for interpretation of parameters in Step R9' is eliminated, although two backprojection pixel data storage sections 71 and 72 are required.

Third Embodiment

While one axially projected datum D1 is calculated by interpolation calculation from two projection data D0 in the first and second embodiments, the one axially projected datum D1 is calculated by interpolation calculation from three projection data D0 in a third embodiment.

In this case, a lookup table 31' for axial projection as shown in FIG. 19 is employed, and the axially projected data D1 are calculated according to the following equation:

$$D1(\text{view}, pt) = k1(pt) \times D0(\text{view}, ch(pt)+12) + k2(pt) \times D0(\text{view}, ch(pt)+) + k3(pt) \times D0(\text{view}, ch(pt))$$

According to the X-ray CT apparatus of the third embodiment, the backprojection processing can be simplified and sped up. Moreover, accuracy is improved.

Other Embodiments

While two-point interpolation or three-point interpolation is employed in obtaining D3 from D0 in the preceding embodiments, interpolation by four or more points may be employed.

Moreover, while a medical X-ray CT apparatus is considered in the preceding embodiments, the present invention can be applied to an industrial X-ray CT apparatus.

Many widely different embodiments of the invention may be configured without departing from the spirit and the scope of the present invention. It should be understood that the present invention is not limited to the specific embodiments described in the specification, except as defined in the appended claims.

What is claimed is:

1. A backprojection method comprising the steps of:
    obtaining axially projected data D1 by projecting projection data D0(view, ch) obtained by a fan beam represented by a view angle view and a detector channel ch onto a straight projection axis;
    then, obtaining backprojection pixel data D2 by projecting said axially projected data D1 onto pixels constituting a reconstruction region; and
    obtaining backprojection data D3 by adding the backprojection pixel data D2 for all views employed in image reconstruction on a pixel-to-pixel basis.

2. The backprojection method of claim 1, wherein when a direction of a center axis of the fan beam at view=0° is represented by a y-direction and a direction orthogonal to the y-direction and parallel to a fan beam plane is represented by an x-direction, said projection axis is defined as a straight line passing through a center of reconstruction and parallel to the x-direction for a view angle range of −45°≦view<45° or a view angle range mainly including the range and also including its vicinity, and for a view angle range of 135°≦view<225° or a view angle range mainly including the range and also including its vicinity; and said projection axis is defined as a straight line passing through the center of reconstruction and parallel to the y-direction for a view angle range of 45°≦view<135° or a view angle range mainly including the range and also including its vicinity, and for a view angle range of 225°≦view<315° or a view angle range mainly including the range and also including its vicinity.

3. The backprojection method of claim 1, wherein one axially projected datum D1 is obtained by interpolation calculation from a plurality of projection data D0.

4. The backprojection method of claim 1, wherein addresses of the plurality of projection data D0 and interpolation factors for obtaining the one axially projected datum D1 are set in a table.

5. The backprojection method of claim 1, further comprising the steps of: obtaining one axially projected datum D1 by interpolation calculation from a plurality of projection data D0; setting in a table addresses of the plurality of projection data D0 and interpolation factors for obtaining the one axially projected datum D1 for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and using said table for other view angle ranges.

6. The backprojection method of claim 1, wherein the backprojection pixel data D2 are obtained by transformation calculation from the axially projected data D1.

7. The backprojection method of claim 1, wherein parameters for said transformation calculation are set in a table.

8. The backprojection method of claim 1, further comprising the steps of: obtaining one backprojection pixel datum D2 by transformation calculation from one axially projected datum D1; setting in a table parameters for the transformation calculation for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and using said table for other view angle ranges.

9. The backprojection method of claim 1, further comprising the steps of: separately conducting addition of the backprojection pixel data D2 for a view angle range of −45°≦view<45° or a view angle range mainly including the range and also including its vicinity and for a view angle range of 135°≦view<225° or a view angle range mainly including the range and also including its vicinity, and addition of the backprojection pixel data D2 for a view angle range of 45°≦view<135° or a view angle range mainly including the range and also including its vicinity and for a view angle range of 225°≦view<315° or a view angle range mainly including the range and also including its vicinity; and obtaining the backprojection data D3 by finally adding the sums from the additions.

10. An X-ray CT apparatus comprising:
an X-ray tube;
a detector for detecting X-rays of a fan beam;
scanning means for collecting projection data D0(view, ch) represented by a view angle view and a detector channel cl while rotating at least one of said X-ray tube and said detector around a subject to be imaged;
axially projected data calculating means for obtaining axially projected data D1 by projecting said projection data D0(view, ch) onto a straight projection axis;
backprojection pixel data calculating means for obtaining backprojection pixel data D2 by projecting said axially projected data D1 onto pixels constituting a reconstruction region; and
backprojection data calculating means for obtaining backprojection data D3 by adding the backprojection pixel data D2 for all views employed in image reconstruction on a pixel-to-pixel basis.

11. The X-ray CT apparatus of claim 10, wherein when a direction of a center axis of the fan beam at view=0° is represented by a y-direction and a direction orthogonal to the y-direction and parallel to a fan beam plane is represented by an x-direction, said axially projected data calculating means defines said projection axis as a straight line passing through a center of reconstruction and parallel to the x-direction for a view angle range of −45°≦view<45° or a view angle range mainly including the range and also including its vicinity, and for a view angle range of 135°≦view<225° or a view angle range mainly including the range and also including its vicinity; and defines said projection axis as a straight line passing through the center of reconstruction and parallel to the y-direction for a view angle range of 45°≦view<135° or a view angle range mainly including the range and also including its vicinity, and for a view angle range of 225°≦view<315° or a view angle range mainly including the range and also including its vicinity.

12. The X-ray CT apparatus of claim 10, wherein said axially projected data calculating means obtains one axially projected datum D1 by interpolation calculation from a plurality of projection data D0.

13. The X-ray CT apparatus of claim 10, wherein said axially projected data calculating means uses a table in which addresses of the plurality of projection data D0 and interpolation factors for obtaining the one axially projected datum D1 are set.

14. The X-ray CT apparatus of claim 10, wherein that said axially projected data calculating means obtains one axially projected datum D1 by interpolation calculation from a plurality of projection data D0; sets in a table addresses of the plurality of projection data D0 and interpolation factors for obtaining the one axially projected datum D1 for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and uses said table for other view angle ranges.

15. The X-ray CT apparatus of claim 10, wherein said pixel projection data calculating means obtains the backprojection pixel data D2 by transformation calculation from the axially projected data D1.

16. The X-ray CT apparatus of claim 10, wherein said pixel projection data calculating means uses a table in which parameters for said transformation calculation are set.

17. The X-ray CT apparatus of claim 10, wherein said pixel projection data calculating means obtains one backprojection pixel datum D2 by transformation calculation from one axially projected datum D1; sets in a table parameters for the transformation calculation for any one of a view angle range of −45°≦view<45° or a view angle range mainly including the range and also including its vicinity, a view angle range of 135°≦view<225° or a view angle range mainly including the range and also including its vicinity, a view angle range of 45°≦view<135° or a view angle range mainly including the range and also including its vicinity, and a view angle range of 225°≦view<315° or a view angle range mainly including the range and also including its vicinity; and uses said table for other view angle ranges.

18. The X-ray CT apparatus of claim 10, wherein said backprojection data calculating means separately conducts addition of the backprojection pixel data D2 for a view angle range of −45°≦view<45° or a view angle range mainly including the range and also including its vicinity and for a view angle range of 135°≦view<225° or a view angle range mainly including the range and also including its vicinity, and addition of the backprojection pixel data D2 for a view angle range of 45°≦view<135° or a view angle range mainly including the range and also including its vicinity and for a view angle range of 225°≦view<315° or a view angle range mainly including the range and also including its vicinity; and obtains the backprojection data D3 by finally adding the sums from the additions.

* * * * *

UNITED STATES PATENT AND TRADEMARK OFFICE
CERTIFICATE OF CORRECTION

PATENT NO. : 6,795,522 B2
DATED : September 21, 2004
INVENTOR(S) : Nishide et al.

It is certified that error appears in the above-identified patent and that said Letters Patent is hereby corrected as shown below:

Column 17,
Line 27, after "channel" delete "el" and insert -- ch --.

Signed and Sealed this

Thirtieth Day of May, 2006

JON W. DUDAS
*Director of the United States Patent and Trademark Office*